United States Patent
Ames et al.

(10) Patent No.: US 12,480,933 B2
(45) Date of Patent: Nov. 25, 2025

(54) SYSTEMS AND METHODS FOR AUTOMATICALLY CHARACTERIZING LUMBER

(71) Applicant: BotBuilt, Inc., Durham, NC (US)

(72) Inventors: Christopher Barrett Ames, Durham, NC (US); Adam Konneker, Durham, NC (US)

(73) Assignee: Botbuilt, Inc., Durham, NC (US)

( * ) Notice: Subject to any disclaimer, the term of this patent is extended or adjusted under 35 U.S.C. 154(b) by 0 days.

(21) Appl. No.: 19/175,834

(22) Filed: Apr. 10, 2025

(65) Prior Publication Data

US 2025/0321217 A1    Oct. 16, 2025

Related U.S. Application Data

(60) Provisional application No. 63/632,420, filed on Apr. 10, 2024.

(51) Int. Cl.
| | | |
|---|---|---|
| G01N 33/46 | (2006.01) |
| B41J 3/01 | (2006.01) |
| B41J 3/407 | (2006.01) |
| G01N 21/956 | (2006.01) |

(52) U.S. Cl.
CPC .............. G01N 33/46 (2013.01); B41J 3/01 (2013.01); B41J 3/4075 (2013.01); G01N 21/956 (2013.01)

(58) Field of Classification Search
CPC ...... G01N 33/46; G01N 21/95; G01N 21/956; B41J 3/01; B41J 3/4075
See application file for complete search history.

(56) References Cited

U.S. PATENT DOCUMENTS

| | | | |
|---|---|---|---|
| 6,624,883 B1 * | 9/2003 | Zhou ...................... G01B 11/30 356/237.1 |
| 10,987,822 B2 * | 4/2021 | Ursella ................... G01N 33/46 |
| 2010/0079534 A1 | 4/2010 | Fellingham et al. |
| 2010/0141754 A1 * | 6/2010 | Hiraoka ............. G01N 21/8986 348/93 |
| 2017/0068171 A1 | 3/2017 | Moest et al. |

(Continued)

FOREIGN PATENT DOCUMENTS

| | | | | |
|---|---|---|---|---|
| AU | 2010200462 A1 * | 2/2010 | ............... B07C 5/14 |
| CA | 2485668 A1 * | 4/2006 | ............... B07C 5/14 |

(Continued)

OTHER PUBLICATIONS

International Search Report and Written Opinion for International Patent Application No. PCT/US2025/024130, dated Jul. 1, 2025.

*Primary Examiner* — Nguyen Q. Ha
(74) *Attorney, Agent, or Firm* — Goodwin Procter LLP

(57) ABSTRACT

A system for characterization of lumber is presented. The system includes a computing module having processor that generates a first fiducial to be printed on the lumber. The system includes an applicator module having a first printer that prints the first fiducial onto the lumber. The system includes a vision module having a camera that captures the first fiducial as printed on the lumber. The processor of the computing module determines lumber information based on a print distortion of the first fiducial as printed on the lumber. The first printer of the applicator module prints a label including the lumber information onto the lumber.

20 Claims, 8 Drawing Sheets

(56) References Cited

U.S. PATENT DOCUMENTS

| | | | |
|---|---|---|---|
| 2020/0191765 A1* | 6/2020 | Narasimhan | G06T 7/0004 |
| 2021/0157998 A1 | 5/2021 | Rodriguez et al. | |
| 2023/0024974 A1* | 1/2023 | Rendahl | G06V 10/147 |

FOREIGN PATENT DOCUMENTS

| | | | | |
|---|---|---|---|---|
| EP | 4137283 A1 * | 2/2023 | | B27L 5/00 |
| GB | 2265136 A | 9/1993 | | |
| WO | WO-03104777 A1 * | 12/2003 | | B07C 5/34 |
| WO | WO-2008110017 A1 * | 9/2008 | | G01N 21/49 |

* cited by examiner

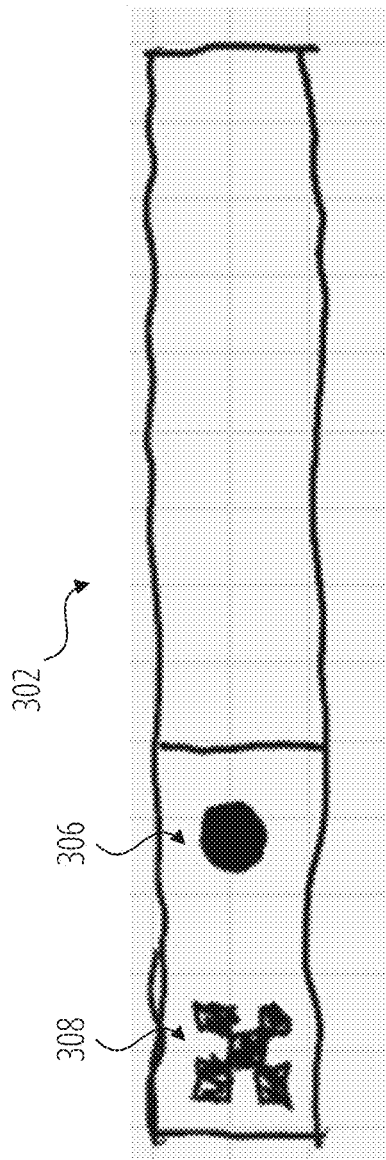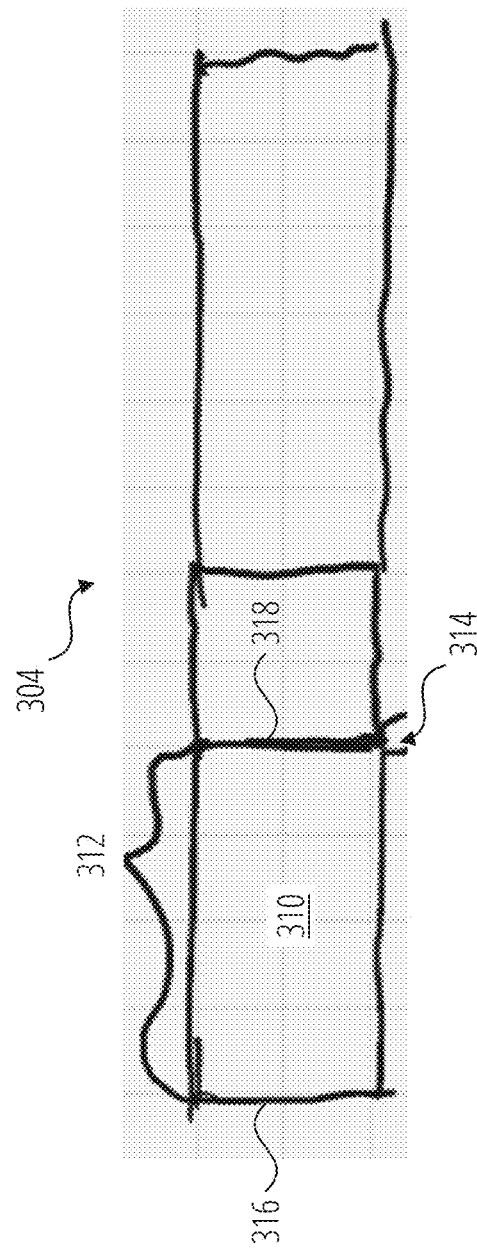
FIG. 3A
FIG. 3B

SYSTEMS AND METHODS FOR AUTOMATICALLY CHARACTERIZING LUMBER

CROSS-REFERENCE TO RELATED APPLICATIONS

This application claims priority to and the benefit of U.S. Provisional Application No. 63/632,420 titled "Systems and Methods for Automatically Characterizing Lumber" and filed Apr. 10, 2024 which is incorporated herein by reference in its entirety.

TECHNICAL FIELD

The present disclosure generally relates to systems and methods for characterizing lumber. In particular, systems and methods for automatically detecting, inspecting, and applying labels to lumber, and using a determined print distortion of a printed label and/or fiducial on the lumber to characterize the lumber for constructions applications.

BACKGROUND

Identifying and tracking lumber for use in conventional lumber-based construction operations can be a manual process. For example, conventional lumber-based construction may not make use of historical information for individual pieces of lumber. Quality assurance for lumber can also be ambiguous to the features of individual pieces of lumber, e.g., once inspection has been passed, no prior information, identification, or tracking information for individual pieces of lumber is stored or used in the construction process.

The foregoing discussion, including the description of motivations for some embodiments of the invention, is intended to assist the reader in understanding the present disclosure, is not admitted to be prior art, and does not in any way limit the scope of any of the claims.

SUMMARY

A system for characterization of lumber is presented. In some embodiments, the system can include a computing module having processor that generates a first fiducial to be printed on the lumber. In some examples, the system can include an applicator module having a first printer that prints the first fiducial onto the lumber. The system can include a vision module having a camera that captures the first fiducial as printed on the lumber. The processor of the computing module can determine lumber information based on a print distortion of the first fiducial as printed on the lumber. The first printer of the applicator module can print a label including the lumber information onto the lumber.

Various embodiments of the system can include one or more of the following features.

In some embodiments, the print distortion can include at least one of a print deviation, a print offset, or a print error. In some examples, the lumber information can include at least one of a size, a shape, a length, a width, a height, a thickness, a wood type, an age, a color, or a curvature of the lumber. The processor can generate a unique identifier that corresponds to the lumber based on the lumber information, and can generate the label based on the unique identifier. The label can include at least one of a size, a shape, a length, a width, a height, a thickness, a wood type, an age, a color, or a curvature of the lumber. The label can include at least one of a linear barcode, or a two dimensional barcode. The processor can store the lumber information into a storage device of the computing module. The first printer can include at least one of an inkjet printer, a laser printer, or a pen plotter. The first printer can adjust the printing of the first fiducial based on a distance of the first fiducial from an edge of the lumber. The first printer can adjust at least one of a visual odometry or a scale of the first fiducial based on the distance of the first fiducial from the edge of the lumber. The first printer can print visual landmarks into the first fiducial that represent the distance of the first fiducial from the edge of the lumber. The first printer can adjust the printing of the first fiducial based on a predetermined print error. The processor can generate a second fiducial, and the applicator module includes a second printer that prints the second fiducial unto the lumber. The second printer can adjust the printing of the second fiducial based on a print offset between the first fiducial and the second fiducial. The print distortion can include a print offset between the first fiducial and the second fiducial. The processor can determine a print error based the print offset.

A method for automatically characterizing lumber is presented. In some embodiments, the method can include generating, using a processor, a first fiducial to be printed on the lumber. In some examples, the method can include printing, using a first printer, the first fiducial onto the lumber. The method can include capturing, using a camera, the first fiducial as printed on the lumber. The method can include determining, using the processor, lumber information based on a print distortion of the first fiducial as printed on the lumber. The method can include printing, using the first printer, a label including the lumber information onto the lumber.

Various embodiments of the method can include one or more of the following steps.

In some embodiments, the method can include, prior to printing the label, generating a unique identifier that corresponds to the lumber based on the lumber information, and can include generating the label based on the unique identifier. In some examples, the label can include at least one of a linear barcode, or a two dimensional barcode. The method can include generating, using the processor, a second fiducial to be printed on the lumber. The method can include printing, using a second printer, the second fiducial onto the lumber. The method can includes capturing, using a camera, the second fiducial as printed on the lumber. Determining the lumber information based on the print distortion can include determining, using the processor, a print error between the first and second fiducials. The method can include adjusting, using the first and second printers, the printing of the first or second fiducial based on the print error.

BRIEF DESCRIPTION OF THE SEVERAL VIEWS OF THE DRAWINGS

The accompanying figures, which are included as part of the present specification, illustrate the presently preferred embodiments and together with the generally description given above and the detailed description of the preferred embodiments given below serve to explain and teach the principles described herein.

FIG. 3A illustrates exemplary labels for characterizing lumber, according to some embodiments.

FIG. 3B illustrates exemplary labels depicting print length and print error, according to some embodiments.

Figure 1:
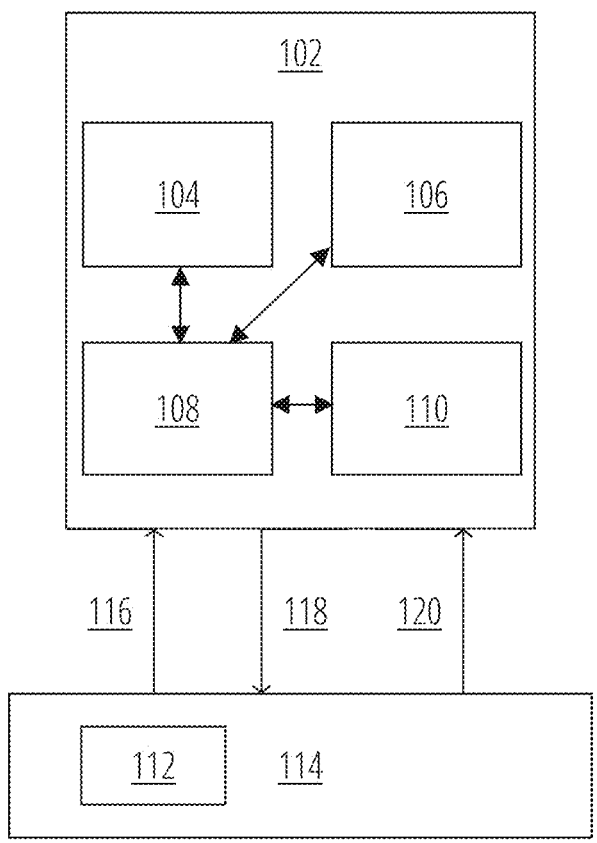
FIG. 1 illustrates a system for characterization of lumber, according to some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Conventional lumber-based construction uses lumber as is, e.g., without consideration of the individual characteristics of each piece of lumber. Conventional lumber based construction does not keep track of useful information related to individual pieces of lumber due to the variation in the size, and shape, of each individual piece of lumber. For example, convention construction techniques typically do not consider whether a specific piece of lumber includes properties (size, shape, type of wood, etc.) that may be a match for the construction project being performed. Rather, for example, several pieces of lumber can grouped together with respect to similar characteristics and one or more pieces of lumber can be selected based on the grouping. Quality assurance for lumber is also generally ambiguous of the features of individual pieces of lumber. In one example, once inspection has been passed no prior information, identification, or tracking information for individual pieces of lumber is stored or used in the construction process. Having lumber information, e.g., that includes the features, and/or history of the lumber, can substantially reduce construction time, and improve construction efficiency by providing labeled, tracked, and/or tagged lumber information for use in construction processes and systems. This can allow for informed use of the lumber in the construction processes. Furthermore, individual pieces of lumber installed on a work site can be identified and tracked to provide historical lumber information. The historical lumber information can allow for the capability to determine which pieces of lumber were installed at a particular work site, and when the lumber was used in construction.

Systems and methods for automatically characterizing lumber are presented below, to address the shortcomings of the described lumber-based construction systems and techniques described above.

The present disclosure generally relates to systems and methods for automated characterization of lumber for residential, commercial and/or industrial construction. In some examples, characterizing lumber can include inspecting the lumber to determine features (length, height, etc.) of the lumber, and applying a unique label that identifies lumber based on the determined features. The systems and methods can include identifying the lumber based on the label and/or the determined features. For example, the systems, processes, and/or techniques presented herein provide for automatically detecting the lumber, inspecting the lumber, applying labels to lumber, and tracking the lumber. In some examples, the labels can be used to classify the lumber for particular use in residential, commercial and/or industrial building applications. Classifying the lumber can include categorizing, grouping, and sorting the lumber using the labels.

As described herein, the term lumber can be used to refer to wood, treated wood, wood boards, wood panels, and/or any type of wood which can be used for residential, commercial and/or industrial construction applications. In some examples, the terms lumber, wood, treated wood, wood panel, as used herein, can be used interchangeably. Similarly, as described herein, lumber, wood, treated wood, wood boards, wood panels, and/or any type of wood can refer to a single piece of lumber and/or wood, or multiple pieces of lumber and/or wood.

System for Automatic Characterization of Lumber

In some embodiments, a system for characterization of lumber is presented, according to some embodiments. In some examples, the system can be used to identify and track lumber for use in lumber-based construction operations. The system can be used to characterize the lumber for use in construction based on one or more features of the lumber including size, shape, length, width, height, thickness, wood type, age, color, curvature, among other features. The system can receive lumber, inspect the lumber to gather lumber information associated with each lumber, generate a label based on the lumber information, and apply the label onto the lumber that corresponds to the lumber information. The lumber information generated can be collected, compiled, stored and/or used for subsequent construction and/or assembly processes. The system can inspect the lumber, and compare the lumber against a quality assurance information. The system can accept and/or reject lumber based on the quality assurance information. The system can use the lumber information to identify and/or or track individual pieces of lumber along a construction process, and/or to determine where and when the lumber was installed and/or used. The system can substantially reduce construction time, and improve construction efficiency, by using the uniquely labeled, tracked, and/or tagged lumber in the construction process. For example, lumber can be pre-selected for a particular work site and application. Upon arriving at the work site, the lumber can be used in the construction application immediately since the lumber was already pre-allocated for the specific application. Since the lumber is pre-selected, the construction process can be informed of how much lumber to use and where it will be used. No additional lumber may need to be ordered. In some examples, the system can identify individual pieces of lumber installed at the work site, and/or track the lumber used in a construction process using the lumber's unique label. The system can use the lumber information to determine which lumber was used, and when the lumber was installed at the particular work site. The system can perform lumber inspection, label printing, quality assurance, identification, and/or characterization of lumber automatically, e.g., each step can be performed independently without human intervention.

Referring to FIG. 1, a system for characterization of lumber 102 is shown, according to some embodiments. In some embodiments, the system 102 can include a vision module 104, applicator module 106, computing module 108, and sensor module 110, among other modules and/or components. In some examples, the system 102 can be used to inspect 116 one or more lumber 114, determine lumber information based on the inspection, generate a label 112 based on the lumber information, and print 118 the label 112 onto the lumber 114. The system can be used to identify 120, classify, track, and characterize the lumber 114 based on the printed label 112. The system 102 can be used to automatically inspect 116, and print 118 the label 112 to the lumber 114, and based on the generated label 112, the system 102 can identify 120, classify, track, and characterize the lumber 114 for residential, commercial and/or industrial construction applications. In some examples, labels can be applied to the lumber using printing, and/or depositing techniques, among other application techniques. As used herein, applying labels can be referred to as printing labels. The labels 112 can be generated by the system 102 based on the lumber information. The labels 112 generated by the system 102 are interpretable by the vision module 104, e.g., the vision module 104 can be used to read the labels 112 to identify and associate the lumber 114 with lumber information that is stored on the computing module 108. The sensor module 110 can include sensors that can be used to locate the lumber on a work table and/or conveyor of a construction site. The system 102, e.g., via the computing module 108, can be used to monitor data received from the sensor module 110 and the vision module 104, and synchronize printing of the labels 112 based on the data received from the sensor module 110 and/or the vision module 104. In some examples, synchronizing the printing of the labels 112 can include accounting for movement of the lumber 114 on the work table and/or conveyer.

Referring again to FIG. 1, the system for characterization of lumber 102 can be used and/or configured to inspect 116 the lumber 114, and based on the inspection 116, print the label 112 onto the lumber 114. The system 102 can be used and/or configured to track, recognize, and/or identify the lumber 114 (e.g., a physical wood panel and/or board), with the lumber information (e.g., stored digital information) that is associated with the lumber 114. In some examples, the lumber information can include the size, shape, length, width, height, thickness, wood type, age, color, curvature, among other features of the lumber 114. The system for characterization of lumber 102 can be used to, and/or be configured to characterize the features of the lumber 114, and store the characterization data as lumber information associated the lumber 114. The printed 118 label 112 can include a code associated with the lumber information. In some examples, the code can include a linear barcode or one dimensional (1D) barcode, a two dimensional (2D) barcode, a fiducial, among others. The system 102 can process the lumber 114 based on the lumber information associated with the label 112 subsequent to identifying 120 the lumber 114. In some examples, the label 112 can be used to assign and/or process the lumber 114 to a particular construction application and/or construction build. The system 102 can use the label 112 to compare the lumber 114 to determine if the lumber 114 has passed and/or failed quality assurance criteria. The system 102 can monitor for errors in the printed 118 labels 112, and if an error is detected, the system can accommodate for the error during while inspecting the lumber 114. The system 102 can be used to and/or configured to apply a fiducial (e.g., the label 112) onto the lumber 114, and use the fiducial to determine where to install and/or connect mechanical components to the lumber 114.

In some embodiments, the vision module 104 can include a camera. In some examples, the camera can be used to inspect lumber 114 prior to, and/or after applying the label 112. The labels 112 generated by the system 102 can be scanned, read, interpreted, and/or decoded by the camera. The camera can be used to capture images and/or video of the lumber 114. The camera can be used with the computing module 108 to determine features of the lumber 114. The lumber features can include a size, a shape, a length, a width, a height, a thickness, a wood type, an age, a color, a curvature, among other features of the lumber. The camera can transmit the images and/or video to the computing module 108. In some examples, the images and/or video can be transmitted in real time. Likewise, the computing module 108 can transmit instructions to the camera to capture the images and/or record video. In some examples, the computing module 108 can determine lumber information from the images and/or video. Determining the lumber features can include using the computing module 108 to measure and/or calculate the lumber features from the received images and/or video. After application of the label 112 to the lumber 114, the camera can scan, capture, and/or decode the label 112. The camera can transmit the images, video, and the decoded information of the label 112 to the computing module 108. In some examples, the decoded information from the label 112 can be used by the computing module 108 to identify the lumber 114, and determine lumber information that corresponds to the identified lumber 114. The computing module 108 can use the information received from the camera to identify, track, and/or classify the lumber 114. The lumber information can be stored via the computing module 108.

In some embodiments, the applicator module 106 can include a printer, a laser engraver, a marker, among other label applicators. In some examples, as referred to herein, the printer, laser engraver, and/or marker can be collectively referred to as label applicators. For example purposes, the printer will be described thereafter in the context of label applicators. The printer can include an inkjet printer, a laser printer, a pen plotter, an adhesive label printer, among other printers. The printer can be used to apply the label 112 to the lumber 114. The label 112 can be applied by the printer to lumber using printing, and/or depositing techniques, among other application techniques. As used herein, applying labels can be referred to as printing labels. The computing module 108 can transmit a pattern to the printer which the printer can print as the label 112. The label 112 can include a linear barcode, a 2D barcode, fiducial, among other patterns. The label 112 can represent a unique identifier that corresponds to the lumber information stored via the computing module 108.

In some embodiments, the computing module 108 can includes processor capable of processing instructions for execution within the system 102. The processor can be used to identify 120, classify, track, and/or characterize the lumber 114. The computing module 108, via the processor, can be used to monitor data received from the sensor module 110 and the vision module 104, and synchronize printing of the labels 112 by the applicator module 106 based on the data received from the sensor module 110 and/or the vision module 104. In some examples, synchronizing the printing of the labels 112 can include using the processor determine the movement of the lumber 114 on the work table and/or conveyer. The computing module 108, via the processor, can send instructions to and receive data from each of the vision module 104, applicator module 106, and sensor module 110. In some examples, the processor can be used to receive images, video, and/or lumber measurements from the camera. The processor can be used to generate the label 112 based on the lumber information. The processor can generate a unique label for individual pieces of lumber based on the lumber information. The labels generated using the processor can include at least one of a size, a shape, a length, a width, a height, a thickness, a wood type, an age, a color, a curvature, among other features of the lumber. The processor can transmit the label 112 to the applicator module 106 to print. The processor can receive tracking information of the lumber from sensors of the sensor module. The computing module 108 can include the hardware and software systems described in FIG. 8. In some examples, the processor can be the same or similar to the processor 802 described in FIG. 8. The computing module 108 can store lumber information on a local storage device (e.g., local storage device 806), on a server and/or on the cloud.

In some embodiments, the sensor module 110 can include sensors that can be used to locate, guide, and/or track the lumber 114 on a work table and/or conveyor of a construction site. The sensors can include sensors used in manufacturing automation applications. In some examples, the sensors can include optical sensors, ultrasonic sensors, digital encoders, among other sensors. For example purposes, optical sensors will be described thereafter in the context of the sensors. The optical sensors can be used to locate, guide, and/or track the lumber 114 on the work table and/or conveyor. In some examples, the sensors can transmit tracking information of the lumber 114 on the work table and/or conveyor to the computing module 108. The tracking information can be transmitted to the computing module 108 in real time.

The system 102 can include a computing module 108 having processor that generates a first fiducial to be printed on the lumber 114. In some examples, the system 102 can include an applicator module 106 having a first printer that prints the first fiducial onto the lumber 114. The system can include a vision module 104 having a camera that captures the first fiducial as printed on the lumber. The processor of the computing module 108 can determine lumber information based on a print distortion of the first fiducial as printed on the lumber 114. The first printer of the applicator module 106 can print a label including the lumber information onto the lumber 114. The processor of the computing module 108 can generate a unique identifier that corresponds to the lumber 114 based on the lumber information, and can generate the label based on the unique identifier. The processor of the computing module 108 can store the lumber information into a storage device of the computing module 108. The first printer can include at least one of an inkjet printer, a laser printer, or a pen plotter. The first printer of the applicator module 106 can adjust the printing of the first fiducial based on a distance of the first fiducial from an edge of the lumber. The first printer of the applicator module 106 can adjust at least one of a visual odometry or a scale of the first fiducial based on the distance of the first fiducial from the edge of the lumber. The first printer of the applicator module 106 can print visual landmarks into the first fiducial that represent the distance of the first fiducial from the edge of the lumber. The first printer of the applicator module 106 can adjust the printing of the first fiducial based on a predetermined print error. The processor of the computing module 108 can generate a second fiducial, and the applicator module 106 includes a second printer that prints the second fiducial unto the lumber 114. The second printer of the applicator module 106 can adjust the printing of the second fiducial based on a print offset between the first fiducial and the second fiducial. The processor of the computing module 108 can determine a print error based the print offset.

Figure 2A:
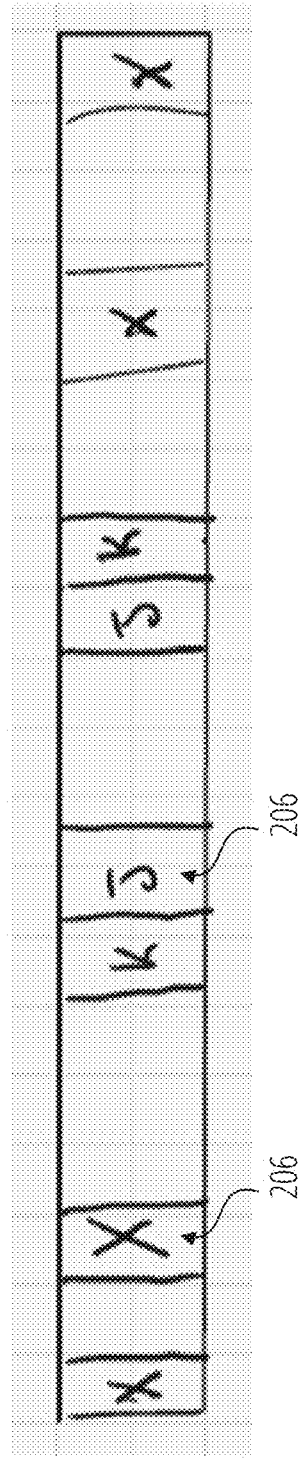
FIG. 2A illustrates exemplary human readable labels for lumber, according to some embodiments.
Figure 2B:
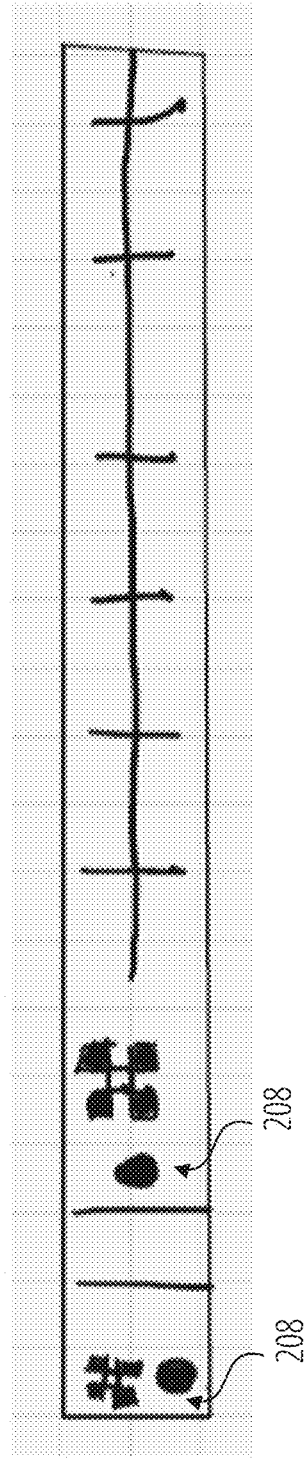
FIG. 2B illustrates exemplary machine readable labels for lumber, according to some embodiments.

Referring to FIG. 2A and FIG. 2B, lumber 202, 204 having exemplary labels 206, 208, are shown, according to some embodiments. In some embodiments, the systems and methods presented herein can generate and print human readable labels 206 and/or machine readable labels 208, onto lumber for use in construction applications. The human readable labels 206 and/or the machine readable labels 208 can be printed to the lumber 202, 204 by printing, engraving, etching, and/or milling, among other techniques. In some examples, the labels 206, 208 can be applied via the label applicator of the applicator module 106. In some examples, the printer can apply the labels 206, 208 to the lumber 202, 204.

Referring to FIG. 2A, lumber 202 having human readable labels 206 is shown, according to some embodiments. The human readable labels 206 can include numbers, letters, among other symbols and/or insignia, that can be recognized and/or read by humans. The human readable labels 206 can be used to assist humans when organizing, tracking, and/or identifying lumber for use in construction applications.

Referring to FIG. 2B, lumber 204 having machine readable labels 208 is shown, according to some embodiments. In some embodiments, the machine readable labels 208 can include patterns and/or symbols that allow for characterization of the lumber 206 by the system. In some examples, the machine readable label 208 can be scanned, captured, and/or decoded by the vision module 104. The camera of the vision module 104 can be used to scan, capture, and/or decode the machine readable labels 208. The machine readable labels 208 can allow for 3D characterization of the lumber 204. In one exemplary use case, the machine readable labels 208 can represent a reference symbol, pattern, and/or insignia for which the construction and/or assembly process can use for applying and/or inserting rails, screws, bolts, among other mechanical features. The machine readable labels 208 can include a pattern and/or physical reference that the vision module 104 from FIG. 1 can identify, and correspond to lumber information and/or lumber data that has been previously stored, e.g., via the computing module 108, on a server and/or on the cloud. The machine readable label 208 can include a bar code. The machine readable label 208 can include, in some examples, a linear bar code (e.g., a 1D barcode), a 2D barcode, among other barcodes and/or combinations of barcodes. The labels 208 can be used to measure and/or as a reference to determine the physical characteristics and features of the lumber. For example, the size and/or shape of the labels 208 can be used by the camera as a reference to measure the actual length, width, and height of the lumber 204. In some examples, the labels 208 can be used to measure the size, shape, length, width, height, thickness, wood type, age, color, curvature, among other features, of the lumber.

Referring to FIG. 3A and FIG. 3B, lumber 302, 304 having exemplary labels 306, 308, 310 are shown, according to some embodiments.

Referring to FIG. 3A, exemplary labels 306, 308, for characterizing lumber 302 are shown, according to some embodiments. In some embodiments, the label 306 and label 308 can include machine readable labels, e.g., labels used for and/or configured to be scanned, read, interpreted, identified, and/or decoded by the system for characterization of lumber (e.g., described at FIG. 2B). In some examples, the label 306 can include a symbol, pattern, fiducial, and/or insignia to represent a location on the lumber 302 to apply, drill, and/or insert rails, screws, and/or bolts, among other mechanical components. The label 308 can include a symbol, pattern, and/or insignia that can be used to identify the lumber 302. In one example, the label 308 can include a bar code, e.g., a linear bar code, a 2D barcode, a fiducial. In some examples, the label 308 can be used by the systems and methods herein to identify a particular piece of lumber, e.g., lumber 302, with respect to another piece of lumber. In an example, the camera of the vision module 104 can capture images and/or video of the label 308. Processor of the computing module 108 can be used to determine a unique identifier that corresponds to the label 308 from the images and/or video. The label 308 can be used to identify where the lumber 302 fits into a construction plan. In an example, the processor can determine an identifier from the label 308, and compare the identifier to a corresponding identifier in the construction plan. The systems and methods described herein can inspect the lumber 302, determine if the lumber 302 meets certain quality assurance criteria based on the inspection, and apply a label (e.g., label 308) to correspond with particular quality assurance criteria. In some examples, the camera of the vision module 104 can be used to capture images and/or video of the lumber 302, transmit the images and/or video to the processor of the computing module 108. The processor can determine lumber information that corresponds to the lumber 302 from the images and/or video. Based on the lumber information, the processor can determine if the lumber 302 falls within a quality assurance criteria. The applicator module 106 can use the printer to apply a label (e.g., label 308) that corresponds with the quality assurance criteria. The label 308 can include, represent, and/or be associated with the lumber information. The lumber information can include an identification number for the lumber 302, features of the lumber 302, physical criteria of the lumber 302, quality assurance criteria of the lumber 302, quality assurance results for the lumber 302 (e.g., pass, fail, acceptable, reject, etc.).

Referring to FIG. 3B, exemplary labels 310 depicting print length 312 and print error 314 are shown, according to some embodiments. In some embodiments, the label 310 can represent the labels described herein. In some examples, the label 310 can include a machine readable label 208. The label 310 can include the label 306 and/or label 308. In some embodiments, the label 310 can have a length 312 and an application error 314. The length 312 can include a measurement of the distance between an edge 316 of lumber 304 to an end 318 of the label 310, e.g., as shown in FIG. 3B. The application error 314 can include a deviation between the expected length of the label 310 in comparison to the actual length 312 of the label 310 as printed onto the lumber 304. The systems and methods described herein can be agnostic to any application and/or print error of the label 310 that occurs during the application of the 310. In some examples, the systems and methods described herein can be agnostic to a thickness of lines used in the label 310, a curvature of the lumber 114, a scale ambiguity of the labels 310, inconsistency of the label 310 features due to potential errors in calibration, fuzzy and/or unclear edges of the label 310, bleeding of deposited ink for the label 310, occlusion of patterns and/or symbols of the label 310, among other sources of error.

Figure 4:
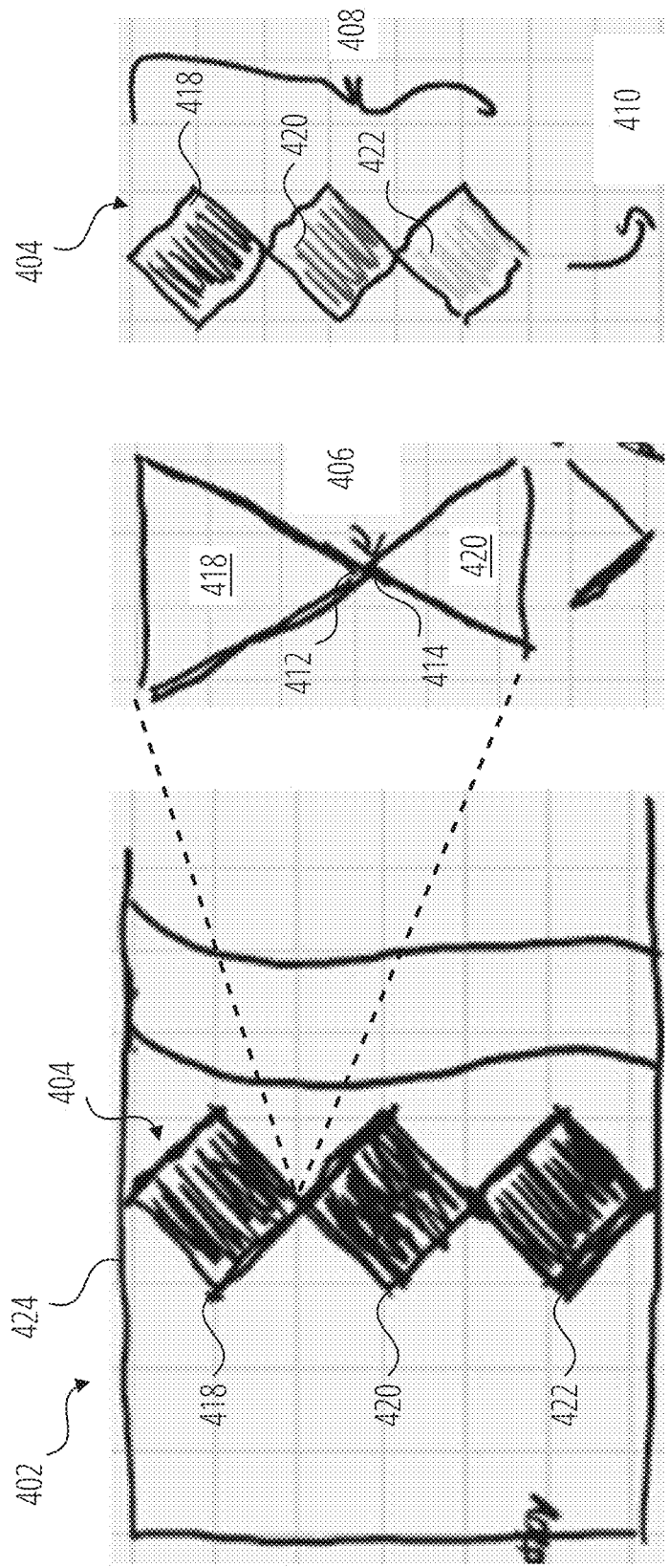
FIG. 4 illustrates exemplary labels for characterizing print resolution and print quality, according to some embodiments.

Referring to FIG. 4, exemplary labels 404 for characterizing print resolution 406 and print quality 408 are shown, according to some embodiments. The labels 404 can represent the labels described herein. In some examples, the labels 404 can include the machine readable label 208. The labels 404 can include the label 306 and/or label 308. The labels 404 can collectively refer to labels 418, 420, 422. A label resolution 406 of the labels 404 is shown. For example, the label resolution 406 can be represented by a deviation and/or offset between two printed points 412, 414 on the label 418 and label 420, respectively. A print quality 408 of the labels 404 is shown. The print quality 408 can include changing print across each of label 418, 420, 422. For example, the accuracy, sharpness, and/or uniformity of each of the labels 418, 420, 422 that make up the label 404 can vary. The print quality 408 of the labels 404 can change based on the type of wood for the lumber 402. In some examples, the print quality 408 can change based on a wood grain of the lumber 402. In one non-limiting example, each label 418, 420, 422 can have unique label patterns 410. The processor of the computing module 108 can be used to determine an offset of the entire print 404 from an edge 424 of the lumber 402 based on the individual patterns of each of the labels 418, 420, 422. In a similar manner, the individual patterns of each of the labels 418, 420, 422 can be used by the processor as a reference to measure a deviation and/or offset from a joint of the lumber 402. In an example, the processor can compare the patterns of each of the labels 418, 420, 422 with stored patterns, and use the comparison to identify an offset from a joint of the lumber 402. In some embodiments, visual odometry, visual landmarks, and/or adjusting the scale of each of the labels 418, 420, 422 as each of the labels get further from the edge 424, among other techniques, can be used to accommodate for, mitigate, and/or adjust for relative label error build-up.

Figure 5:
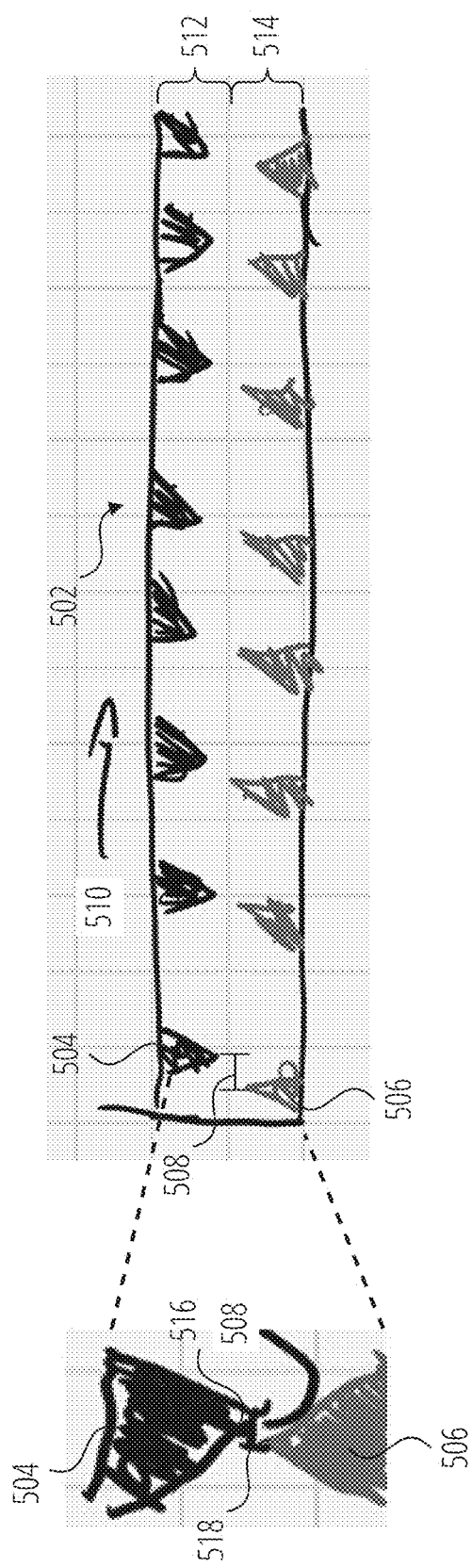
FIG. 5 illustrates exemplary labels for characterizing print error, according to some embodiments.

Referring to FIG. 5, exemplary labels 504, 506 for characterizing print error 508 are shown, according to some embodiments. In some embodiments, the labels 504 and labels 506 can represent the labels described herein. In some examples, the labels 504, 506 can include a machine readable labels 208. The labels 504, 506 can include the label 306 and/or label 308. To illustrate a potential print error 508 between printed labels, exemplary labels 504 are shown to be located on one side 512 of lumber 502, and exemplary labels 506 are shown to be located on another opposite side 514 of the lumber 502. The labels 504 can have peaks 516, and labels 506 can have peaks 518. In an ideal configuration, the peaks 516 of the labels 504 should meet and/or contact the peaks 518 of the labels 506. In an example, for the ideal configuration, the length and/or distance representing the error 508 can be approximately zero. As shown, the print error 508 between labels 504 and labels 506 can include an distance and/or offset that the peaks 516 deviate from the peaks 518. In some examples, the print error 508 can increase over the distance traveled 510 across the lumber 502. The error 508 can be represented by a difference between the distance separating the peaks 516, 518 of the labels 504, 506 (as shown). In some examples, the camera of the vision module 104 can be used to capture images and/or video of the labels 504, 506. The processor of the computing module 108 can be used to measure a distance representing the error 508 between peaks 516, 518 from the images and/or video of the labels 504, 506. The processor can be used to calculate the error 508 based on the measurement. The processor can be used to adjust the printing of the printers of the applicator module 106 based on the error 508. The same printer can be used to print the labels 504, 506. Separate, and/or different, printers can be used to print the labels 504 and the labels 506.

Figure 6:
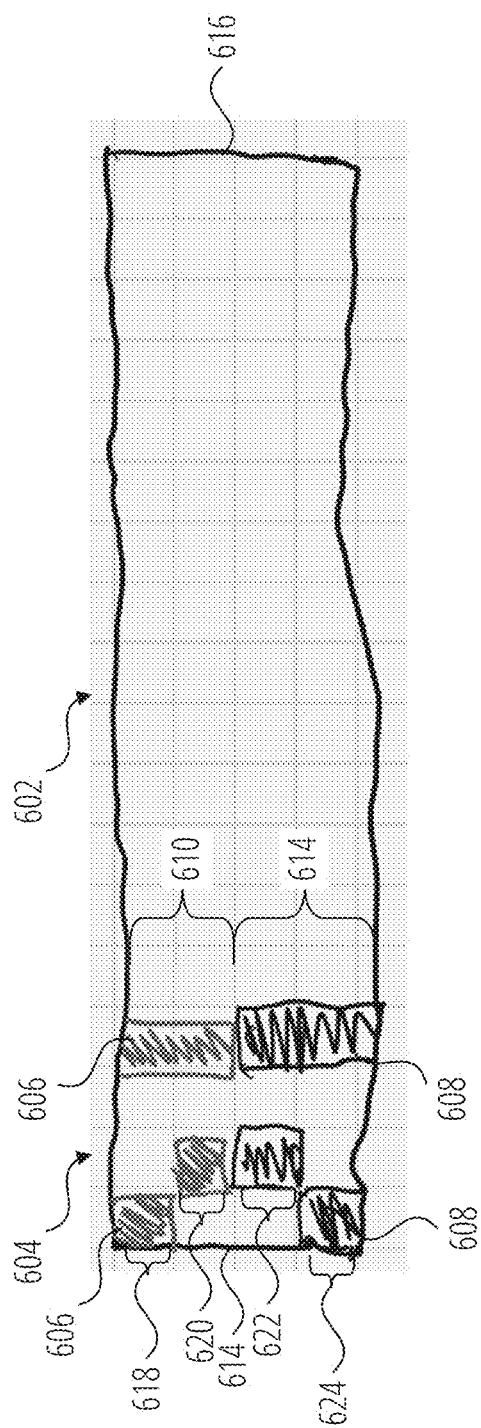
FIG. 6 illustrates an exemplary encoder diagram printed on lumber, according to some embodiments.

Referring to FIG. 6, an exemplary encoder diagram 604 is shown, according to some embodiments. The encoder diagram 604 can be printed to the lumber 602. In some examples, the encoder diagram 604 can include labels 606 and labels 608. The labels 606 and labels 608 can represent the labels described herein. For example, the labels 606 and labels 608 can include the machine readable labels 208, 306, 308. The labels 606 can include corresponding blocks 618, 620. The labels 608 can include corresponding blocks 622, 624. The blocks 618, 620, 620, 622 of the labels 606, 608 are exemplary, and one or more blocks of similar or different configurations can be used. The systems and methods described herein can use the encoder diagram 604 to characterize a difference between individual labels 606 and labels 608. In some examples, the camera of the vision module 104 can capture images and/or video of the encoder diagram 604. The processor can compare the images and/or video of the encoder diagram 604, labels 606, and labels 608 to stored encoder diagrams. In some examples, the processor can be used to determine similarities and/or differences between the labels 606, 608 from stored labels. The processor can be used to determine similarities and/or differences between the labels 606, 608 as printed. In some examples, the labels 606 and the labels 608 can represent two measurement systems and/or calibration systems. In an example, the measurement and/or calibration systems can include printed patterns that can be used to calibrate the printing of the labels 606, 608 onto the lumber 602. As used herein, the term calibration pattern can also be used to refer to calibration system. The labels 606 can be printed on one side 610 of the lumber 602, and the labels 608 can be printed on the other side 612 of the lumber 602, as shown. In some examples, labels 606 and labels 608 can be printed with the same calibration pattern. In another example, the labels 606 and labels 608 can be printed with different calibration patterns. An offset and/or deviation between the two calibration systems (labels 606 and labels 608) can deviate the most at one end 616 of the lumber 602. For example, the labels 606 and labels 608 can have minimal deviation and/or offset closer to a first end 614 of the lumber 602, and have an increased deviation and/or offset closer to a second end 616. Encoder diagrams can be used to determine how much printed deviation exists between printed labels. In some examples, the processor of the computing module 108 can be used to generate the encoder diagram 604. An error between the printed labels 606, 608 can be identified, e.g., using the camera and processor from FIG. 1, by measuring a block size of each of the blocks 618, 620, 620, 622 of the labels 606, 608 of the encoder diagram 604. For example, the block size of each of the blocks 618, 620, 620, 622 can be different in comparison to data representing stored blocks, and/or to previously printed blocks, e.g., corresponding to a missed encoder block, and/or the lumber 602 sliding during print (e.g., due to movement of the work table and/or conveyor). The processor can determine if an encoder block is missed and/or determine if a print deviation based on the images and/or video received from the camera. The encoder diagram 604 can allow for the identification of a total length error. The total length error can include a constant offset between printed labels, e.g., referring to the error 508 shown in FIG. 5. In some examples, the encoder diagram 604 can include an absolute encoder diagram. The processor can be used to determine the total length error by measuring the block sizes of the blocks 618, 620, 620, 622 of the labels 606, 608 based on the images and/or video received from the camera. For example, the processor can compare images and/or video of the blocks 618, 620, 620, 622 to stored data, and calculate a deviation and/or offset from the blocks 618, 620, 620, 622 based on the stored data. The processor can be used to determine the total length error by determining if any blocks 618, 620, 620, 622 are missing, or by determining if any duplicate blocks exist.

Method for Automatic Characterization of Lumber

Figure 7:
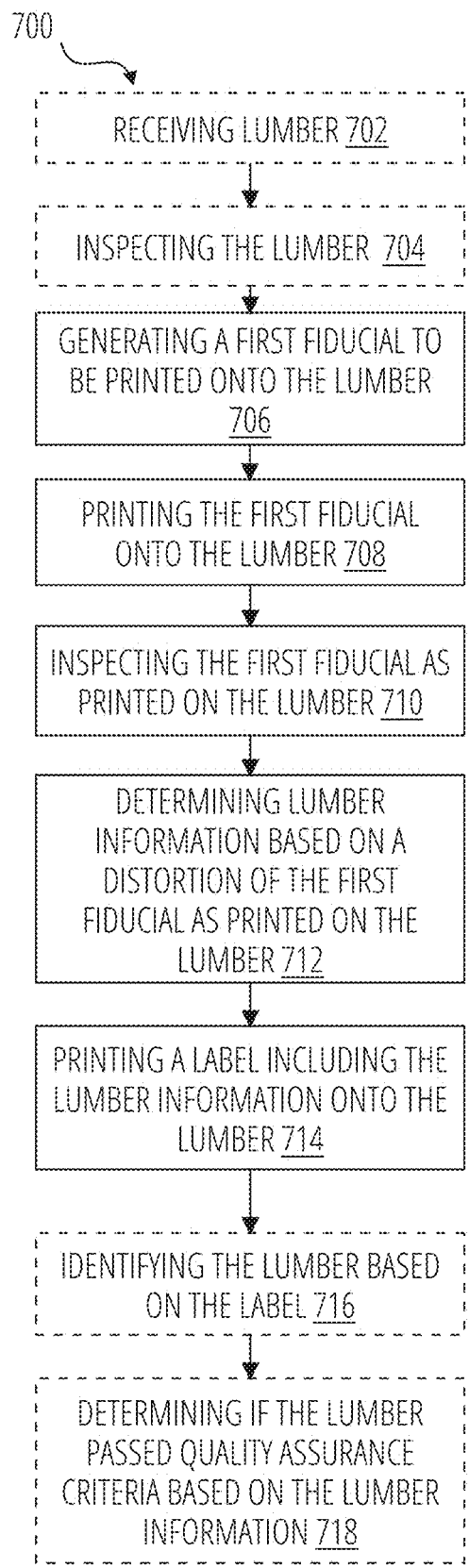
FIG. 7 illustrates a flowchart depicting a method for automatically characterizing lumber, according to some embodiments.

Referring to FIG. 7, a method for automatically characterizing lumber 700 is shown, according to some embodiments. At an optional step 702, the method can include receiving lumber. In some examples, receiving the lumber can include receiving the lumber on a work table and/or conveyor at a construction work site. In some examples, the lumber can already been received, and the method can start at step 704 or 706. At an optional step 704, the method can include inspecting the lumber to gather lumber information associated with each lumber. Step 704 can include using the camera of the vision module 104 (from FIG. 1) to capture images and/or video of the lumber. Step 704 can include using the camera to transmit the images and/or video to the computing module 108. Step 704 can include using the camera and processor of the computing module 108 to determine features of the lumber based on the images and/or video captured by the camera. The lumber features can include a size, a shape, a length, a width, a height, a thickness, a wood type, an age, a color, a curvature, among other features of the lumber. At a step 706, the method can include generating a first label to be printed onto the lumber. In some examples, the first label can include a fiducial. Step 706 can include using the processor to generate a unique label for individual pieces of lumber. The labels generated using the processor can include fiducials, among other labels. Step 706 can include transmitting, via the processor, the first label to the applicator module 106 (e.g., from FIG. 1) to print. At a step 708, the method can include printing the first label onto the lumber. In some examples, step 708 can include using a printer of the applicator module 106 to print the label. Step 708 can include using a printer, using a laser, using an engraver, using a laser engraver, using an inkjet printer, using a pen plotter, among other applications and/or techniques to apply and/or print the first label. Step 708 can include depositing ink to print the first label. Step 708 can include printing a fiducial, among other labels. At a step 710, the method can include inspecting the first label as printed on the lumber. Step 710 can include using the camera to capture images and/or video of the first label. Step 710 can include using the camera to transmit the images and/or video of the first label to the processor. At a step 712, the method can include determining lumber information based on a print distortion of the first label as printed on the lumber. Step 712 can include using the processor to determine the lumber information based on the print distortion. Step 712 can include using the processor to calculate the print distortion. Step 712 can include calculating the print distortion based on images and/or video received from the camera. In some examples, the print distortion can include a print deviation as described in FIG. 3B, a print offset described in FIG. 4, and a print error described in FIG. 5. At a step 714, the method can include printing a second label including the lumber information onto the lumber. The second label can include a linear barcode, a two dimensional (2D) barcode, among others. At an optional step 716, the method can include identifying the lumber based on the second label associated with lumber information. In some examples, identifying the lumber can include tracking individual pieces of lumber along a construction process, and/or to determining where and when the lumber was installed and/or used. At an optional step 718, the method can include determining if the lumber passed quality assurance criteria.

In some embodiments, the method 700 can include generating at step 706, using a processor, a first fiducial to be printed on the lumber. In some examples, the method 700 can include printing at step 708, using a first printer, the first fiducial onto the lumber. The method can include capturing at step 710, using a camera, the first fiducial as printed on the lumber. The method can include determining at step 712, using the processor, lumber information based on a print distortion of the first fiducial as printed on the lumber. The method can include printing at step 714, using the first printer, a label including the lumber information onto the lumber.

In some embodiments, the method 700 can include, prior to printing the label at step 714, generating a unique identifier that corresponds to the lumber based on the lumber information, and can include generating the label based on the unique identifier. In some examples, the label can include at least one of a linear barcode, or a two dimensional barcode. The method can include generating, using the processor, a second fiducial to be printed on the lumber. The method can include printing, using a second printer, the second fiducial onto the lumber. The method can includes capturing, using a camera, the second fiducial as printed on the lumber. Determining the lumber information based on the print distortion can include determining, using the processor, a print error between the first and second fiducials. The method can include adjusting, using the first and second printers, the printing of the first or second labels based on the print error.

In some embodiments, the method can be used to identify and track lumber for use in lumber-based construction operations. The method can be used to characterize the lumber for use in construction based one or more features of the lumber: size, shape, length, width, height, thickness, wood type, age, color, curvature, among other features. The method can substantially reduce construction time, and improve construction efficiency, by using the lumber information associated with the labeled, tracked, and/or tagged lumber in the construction process. In some examples, the method can be used to identify individual pieces of lumber installed at the work site, and/or track the lumber used in a construction process using the lumber's lumber information.

Improvements Over Other Systems and Methods

The systems and methods presented herein provide an improvement to conventional lumber-based construction technology. For example, the systems and methods described herein determine and/or calculate a print distortion of a printed label and/or fiducial as printed on lumber to determine lumber information, and automatically characterize (e.g., identifies, tracks, classifies, categorizes, etc.) individual pieces of the lumber based on lumber information. For example, conventional systems may only receive a lumber and use the lumber based on a plan. Conventional lumber-based construction technology also does not record, track, and use information about each individual piece of lumber to effectively choose the most appropriate piece of lumber for a particular structure. Furthermore, the systems and methods can make use of any inherent print deviation, print offset and/or print error to determine the lumber information which is in contrast to what is performed or described by conventional methods and systems. The systems and methods described herein therefore increase the efficiency for constructing lumber-based structures and reduce construction time by providing labeled, tracked, and/or tagged lumber information for use in construction processes and systems. This can allow for informed use of the lumber in the construction processes. Unlike conventional construction applications, individual pieces of lumber installed on a work site can be identified and tracked to provide historical lumber information. The system can consider a size, shape, type of wood of the lumber and match the lumber for a particular the construction project automatically. Therefore in contrast to other systems, the systems and methods presented here use a determined distortion of the printed label and/or fiducial to determine lumber information, and characterize the lumber based on the determined lumber information.

Hardware and Software Implementations

Figure 8:
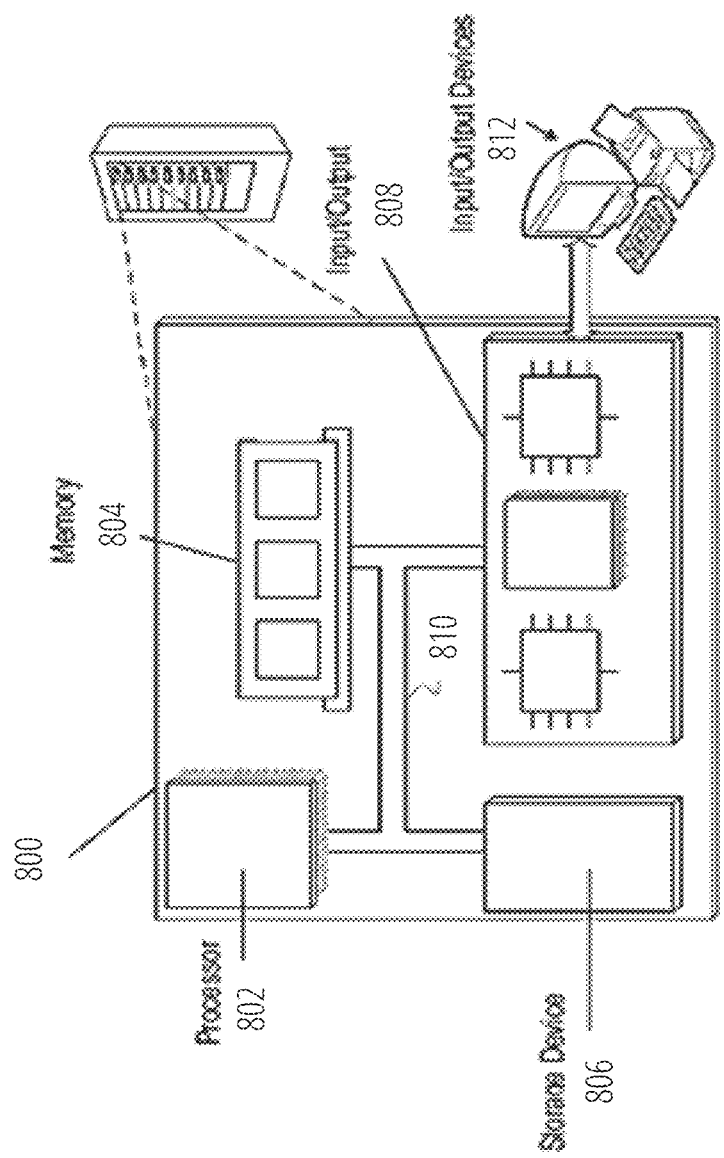
FIG. 8 illustrates a diagram of an exemplary hardware and software systems implementing the systems and methods described herein, according to some embodiments.

FIG. 8 is a block diagram of an example computer system 800 that may be used in implementing the technology described in this document. General-purpose computers, network appliances, mobile devices, or other electronic systems may also include at least portions of the system 800. The system 800 includes a processor 802, a memory 804, a storage device 806, and an input/output device 808. Each of the components 802, 804, 806, and 808 may be interconnected, for example, using a system bus 810. The processor 802 is capable of processing instructions for execution within the system 800. In some implementations, the processor 802 is a single-threaded processor. In some implementations, the processor 802 is a multi-threaded processor. The processor 802 is capable of processing instructions stored in the memory 804 or on the storage device 806.

The memory 804 stores information within the system 800. In some implementations, the memory 804 is a non-transitory computer-readable medium. In some implementations, the memory 804 is a volatile memory unit. In some implementations, the memory 804 is a non-volatile memory unit.

The storage device 806 is capable of providing mass storage for the system 800. In some implementations, the storage device 806 is a non-transitory computer-readable medium. In various different implementations, the storage device 806 may include, for example, a hard disk device, an optical disk device, a solid-date drive, a flash drive, or some other large capacity storage device. For example, the storage device may store long-term data (e.g., database data, file system data, etc.). The input/output device 808 provides input/output operations for the system 800. In some implementations, the input/output device 808 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 812. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 806 may be implemented in a distributed way over a network, for example as a server farm or a set of widely distributed servers, or may be implemented in a single computing de vice.

Although an example processing system has been described in FIG. 8, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; and magneto optical disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of."

"Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention.

What is claimed is:

1. A system for characterization of lumber, the system comprising:
   a computing module having processor that generates a first fiducial to be printed on the lumber;
   an applicator module having a first printer that prints the first fiducial onto the lumber;
   a vision module having a camera that captures the first fiducial as printed on the lumber;
   wherein the processor determines lumber information based on a print distortion of the first fiducial as printed on the lumber; and
   wherein the first printer prints a label including the lumber information onto the lumber.

2. The system of claim 1, wherein the print distortion comprises at least one of a print deviation, a print offset, or a print error.

3. The system of claim 1, wherein the lumber information comprises at least one of a size, a shape, a length, a width, a height, a thickness, a wood type, an age, a color, or a curvature of the lumber.

4. The system of claim 1, wherein the processor generates a unique identifier that corresponds to the lumber based on the lumber information, and generates the label based on the unique identifier.

5. The system of claim 1, wherein the label comprises at least one of a size, a shape, a length, a width, a height, a thickness, a wood type, an age, a color, or a curvature of the lumber.

6. The system of claim 1, wherein the label comprises at least one of a linear barcode, or a two dimensional barcode.

7. The system for characterization of claim 1, wherein the processor stores the lumber information into a storage device of the computing module.

8. The system of claim 1, where the first printer comprises at least one of an inkjet printer, a laser printer, or a pen plotter.

9. The system of claim 1, wherein the first printer adjusts the printing of the first fiducial based on a distance of the first fiducial from an edge of the lumber.

10. The system of claim 9, wherein the first printer adjusts at least one of a visual odometry or a scale of the first fiducial based on the distance of the first fiducial from the edge of the lumber.

11. The system of claim 9, wherein the first printer prints visual landmarks into the first fiducial that represent the distance of the first fiducial from the edge of the lumber.

12. The system of claim 1, wherein the first printer adjusts the printing of the first fiducial based on a predetermined print error.

13. The system of claim 1, wherein the processor generates a second fiducial, and the applicator module has a second printer that prints the second fiducial onto the lumber.

14. The system of claim 13, wherein the second printer adjusts the printing of the second fiducial based on a print offset between the first fiducial and the second fiducial.

15. The system of claim 1, wherein the print distortion comprises a print offset between the first fiducial and a second fiducial printed by a second printer of the applicator module, and the processor determines a print error based the print offset.

16. A method for automatically characterizing lumber, the method comprising:
    generating, using a processor, a first fiducial to be printed on the lumber;
    printing, using a first printer, the first fiducial onto the lumber;
    capturing, using a camera, the first fiducial as printed on the lumber;
    determining, using the processor, lumber information based on a print distortion of the first fiducial as printed on the lumber; and
    printing, using the first printer, a label including the lumber information onto the lumber.

17. The method of claim 16, further comprising:
    prior to printing the label, generating a unique identifier that corresponds to the lumber based on the lumber information, and generating the label based on the unique identifier.

18. The method of claim 16, wherein the label comprises at least one of a linear barcode, or a two dimensional barcode.

19. The method of claim 16 further comprising:
    generating, using the processor, a second fiducial to be printed on the lumber;
    printing, using a second printer, the second fiducial onto the lumber;
    capturing, using the camera, the second fiducial as printed on the lumber; and
    wherein determining the lumber information based on the print distortion comprises determining, using the processor, a print error between the first and second fiducials.

20. The method of claim 19 further comprising:
    adjusting, using the first and second printers, the printing of the first or second fiducials based on the print error.

* * * * *